United States Patent
Fukushima et al.

(10) Patent No.: US 9,862,806 B2
(45) Date of Patent: Jan. 9, 2018

(54) PLASTIC ARTICLE FOR AUTOMOTIVE GLAZING

(75) Inventors: Motoo Fukushima, Annaka (JP); Koichi Higuchi, Annaka (JP); Hisatoshi Komori, Annaka (JP); Masaaki Yamaya, Annaka (JP); Kazumasa Okumura, Kariya (JP); Koichi Chigita, Kariya (JP); Yuya Maruyama, Kariya (JP); Tomokazu Takai, Kariya (JP); Yasumitsu Isobe, Toyota (JP); Nobuya Kawamura, Nissin (JP); Takayuki Nagai, Toyota (JP)

(73) Assignees: SHIN-ETSU CHEMICAL CO., LTD., Tokyo (JP); KABUSHIKI KAISHA TOYOTA JIDOSHOKKI, Kariya-Shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/224,767

(22) Filed: Sep. 2, 2011

(65) Prior Publication Data

US 2012/0058347 A1 Mar. 8, 2012

(30) Foreign Application Priority Data

Sep. 6, 2010 (JP) ................................ 2010-198654

(51) Int. Cl.
C09D 5/32 (2006.01)
B32B 27/08 (2006.01)
C08J 7/04 (2006.01)

(52) U.S. Cl.
CPC ............... *C08J 7/047* (2013.01); *C08J 7/042* (2013.01); *C08J 7/045* (2013.01); *C09D 5/32* (2013.01); *C08J 2369/00* (2013.01); *C08J 2400/108* (2013.01); *C08J 2433/04* (2013.01); *C08J 2483/04* (2013.01); *C08L 2201/08* (2013.01); *Y10T 428/31507* (2015.04); *Y10T 428/31909* (2015.04)

(58) Field of Classification Search
None
See application file for complete search history.

(56) References Cited

U.S. PATENT DOCUMENTS

| 4,321,400 A | 3/1982 | Ashby |
| 4,353,959 A | 10/1982 | Olson et al. |
| 4,555,559 A | 11/1985 | Kimura et al. |
| 4,960,809 A | 10/1990 | Yamaya et al. |
| 5,142,012 A * | 8/1992 | Furukawa ............. C08F 290/06 525/326.5 |
| 5,191,045 A | 3/1993 | Funaki et al. |
| 5,391,795 A | 2/1995 | Pickett |
| 2002/0010273 A1* | 1/2002 | Matsumura et al. ......... 525/100 |
| 2008/0096029 A1* | 4/2008 | Higuchi et al. ............... 428/447 |
| 2008/0217577 A1* | 9/2008 | Hayes ...................... 252/182.29 |
| 2008/0280149 A1* | 11/2008 | Higuchi et al. ............... 428/447 |
| 2011/0201719 A1* | 8/2011 | Uchida et al. ................... 522/99 |

FOREIGN PATENT DOCUMENTS

| CN | 101469249 A | 7/2009 | |
| EP | 1 122 278 A2 | 8/2001 | |
| EP | 1 826 233 A1 | 8/2007 | |
| EP | 1 914 259 A1 | 4/2008 | |
| EP | 1 990 386 A2 | 11/2008 | |
| EP | 2161297 A1 * | 3/2010 | ............. C08G 77/06 |
| JP | 56-92059 A | 7/1981 | |
| JP | 63-168470 A | 7/1988 | |
| JP | 3-14862 B2 | 2/1991 | |
| JP | 3-62177 B2 | 9/1991 | |
| JP | 5-70397 A | 3/1993 | |
| JP | 7-10966 B2 | 2/1995 | |
| JP | 7-278525 A | 10/1995 | |
| JP | 8-151415 A | 6/1996 | |
| JP | 3102696 B2 | 10/2000 | |
| JP | 2001-348528 A | 12/2001 | |
| JP | 2010-100742 A | 5/2010 | |
| WO | WO 2010073445 A1 * | 7/2010 | ............. C08G 77/20 |

OTHER PUBLICATIONS

Extended European Search Report dated Dec. 6, 2011, in European Patent Application No. 11179914.4.
Chinese Office Action and Search Report, dated Nov. 3, 2014, for Chinese Application No. 201110372596.4, along with English translations.

* cited by examiner

*Primary Examiner* — Kenneth Stachel
(74) *Attorney, Agent, or Firm* — Birch, Stewart, Kolasch & Birch, LLP

(57) ABSTRACT

A plastic article is provided wherein a plastic substrate is coated with multiple resin layers including a primer layer comprising a polymer having a UV-absorptive functional group incorporated therein and a weather resistant hardcoat layer comprising a reaction product of alkoxysilyl-containing benzophenone and/or a hydrolyzate thereof.

6 Claims, No Drawings

PLASTIC ARTICLE FOR AUTOMOTIVE GLAZING

CROSS-REFERENCE TO RELATED APPLICATION

This non-provisional application claims priority under 35 U.S.C. §119(a) on Patent Application No. 2010-198654 filed in Japan on Sep. 6, 2010, the entire contents of which are hereby incorporated by reference.

TECHNICAL FIELD

This invention relates to a plastic article serving as a structural replacement for glass, and more particularly, to a plastic article for automotive glazing comprising a polycarbonate or similar resin used as windows and other components in vehicles and a protective coating of a silicone base coating composition formed thereon having mar resistance and weather resistance.

BACKGROUND ART

Nowadays, lightweight, non-shattering, transparent resin materials are widely used as a substitute for transparent flat glass. For example, plastic substrates, especially polycarbonate resins, due to their excellent properties including transparency, impact resistance, and heat resistance, are currently used as structural members in place of glass, in various applications including windows in vehicles and buildings, meter covers and the like. However, it is strongly desired to improve the surface properties of plastic substrates, typically polycarbonate resins because their surface properties like mar resistance and weatherability are poor as compared with glass. Known means for improving the mar resistance of molded polycarbonate resins is by coating the surface of a resin substrate with a thermosetting resin such as organopolysiloxane. Known means for improving weatherability is by providing the surface of a resin substrate with a weather-resistant resin layer containing a UV absorber.

In the prior art, substrates of organic resins or plastics are surface coated with various coating compositions to form surface protective films for the purpose of imparting high hardness and mar resistance. For instance, compositions comprising hydrolyzates or partial hydrolyzates of hydrolyzable organosilanes and optionally, colloidal silica are known. For example, JP-A S63-168470 discloses a coating composition comprising a hydrolyzate and/or partial condensate of an organoalkoxysilane and colloidal silica, wherein the alkoxy group is converted into silanol in the presence of excess water.

Although coatings resulting from such coating compositions have a high hardness and provide sufficient protection for plastic substrates, they lack toughness. Specifically, a thick film of at least 10 μm is prone to crack upon heat curing or upon abrupt temperature changes during outdoor service. Also these coatings have a poor UV screening ability so that the interface between a primer layer (for imparting adhesion to the plastic substrate) and the topcoat layer may be degraded by UV. As a result, the coating may be stripped off and the plastic substrate may be discolored.

JP-A H08-151415 describes that a coating composition comprising a mixture of a benzotriazole or benzophenone base UV-absorptive vinyl monomer and a vinyl monomer copolymerizable therewith is applied onto the surface of a synthetic resin substrate to form a protective coating. It is also known from JP 3102696 that a resin article with a multilayer coating which imparts weather resistance while remaining adhered to the resin substrate is obtainable using a coating composition comprising a copolymer of a benzotriazole or benzophenone base UV-absorptive vinyl monomer, an alkoxysilyl-containing vinyl monomer, and a vinyl monomer copolymerizable therewith. These protective coatings, however, lack mar resistance since they are based on vinyl polymers. It is also a practice in the art to add an organic UV absorber to a silicone layer. However, merely adding the UV absorber to a coating composition leads to low sustainability. That is, the durability of the composition in coating form is poor in that the UV absorber will bleed out and run on the surface after long-term exposure.

It is then proposed to use a silyl-modified organic UV absorber capable of forming a chemical bond with a siloxane compound as the base of a coating. See JP-B H03-14862, JP-B H03-62177, and JP-A H07-278525. This proposal improves sustainability since the UV absorber is strongly bound to the siloxane matrix. On the other hand, these coatings are significantly degraded in the essentially desired mar resistance under the influence of UV absorptive functional group incorporated for weatherability, or develop noticeable microcracks due to a lowering of flexibility.

The method of manufacturing a transparent article having both weatherability and mar resistance is described in JP-A S56-92059 and JP-B H07-10966. Known are UV absorbing transparent articles in which a protective coating of a colloidal silica-containing polysiloxane composition is formed on a transparent substrate via a primer layer having a high loading of UV absorber. JP 3102696 discloses a coated article which is provided with mar resistance and weather resistance by forming a primer layer of a copolymer composition, and forming a colloidal silica-containing polysiloxane resin coating thereon. However, since the topcoat layer does not at all possess weather resistance, the interface between the primer layer and the topcoat layer can be degraded by UV, tending to raise problems like separation between the primer layer and the topcoat layer. The coated article is thus insufficient in long-term weatherability.

As discussed above, a number of attempts have been made to improve the weather resistance, mar resistance and other properties of plastic substrates coated with coating compositions. However, there is not available an article coated with a coating composition which exhibits mar resistance and UV screening property and meets sufficient weather resistance and durability to withstand prolonged outdoor exposure while maintaining transparency to visible light.

CITATION LIST

Patent Document 1: JP-A S63-168470
Patent Document 2: JP-A H08-151415
Patent Document 3: JP 3102696
Patent Document 4: JP-B H03-14862
Patent Document 5: JP-B H03-62177
Patent Document 6: JP-A H07-278525
Patent Document 7: JP-A S56-92059
Patent Document 8: JP-B H07-10966

DISCLOSURE OF INVENTION

An object of the invention is to provide a plastic article for automotive glazing, covered with a coating system which is improved in UV screening property and long-term mar resistance and weather resistance without detracting from visible light transparency.

The invention is directed to a plastic article in which at least two resin layers are formed on a surface of a plastic substrate. The inventors have found that when a first or primer layer of the resin layers which is disposed adjacent the substrate surface is a cured resin layer comprising a vinyl copolymer having alkoxysilyl and UV-absorptive groups and particulate silicon dioxide, and a second or hard top layer of the resin layers which is disposed on the first layer is a cured resin layer of an organopolysiloxane composition comprising a hydrolytic mixture or co-hydrolyzate of organosilicon compounds containing a UV-absorptive organoxysilane and particulate silicon dioxide, the organic UV absorptive group in the primer layer does not bleed out or exacerbate mar resistance because it is fully compatible with particulate silicon dioxide in the hard top and primer layers; and that since organic UV absorptive groups are contained in both the hard top layer and the primer layer, they serve in a synergistic way to efficiently absorb light in the broad UV spectrum, significantly improving the weather resistance of the plastic substrate, typically polycarbonate resin.

The invention provides a plastic article for automotive glazing, comprising a substrate and at least two resin layers on a surface of the substrate, wherein said at least two resin layers include a first layer disposed adjacent the substrate surface and a second layer disposed on the first layer. The first layer is a cured resin layer comprising a vinyl copolymer having alkoxysilyl and UV-absorptive groups and particulate silicon dioxide. The second layer is a cured resin layer of an organopolysiloxane composition comprising a hydrolytic mixture or co-hydrolyzate of organosilicon compounds containing a UV-absorptive organoxysilane and particulate silicon dioxide.

In a preferred embodiment, the first layer comprises a cured product of a coating composition comprising a vinyl copolymer and particulate silicon dioxide, the vinyl copolymer being formed using (a) a UV-absorptive vinyl monomer, (b) an alkoxysilyl-containing vinyl monomer, and (c) another vinyl monomer.

More preferably, the vinyl copolymer used in the first layer is a vinyl resin obtained from copolymerization of 1 to 30% by weight of the UV-absorptive vinyl monomer (a), 1 to 30% by weight of the alkoxysilyl-containing vinyl monomer (b), and 40 to 98% by weight of the other vinyl monomer (c).

The coating composition for forming the first layer may further comprise a dehydrating agent.

In a preferred embodiment, the second layer comprises a cured product of a UV-absorptive coating composition comprising (1) (A) at least one hydrolyzable silicon compound having the general formula (1):

$$R^1_a Si(OR^3)_{(4-a)} \quad (1)$$

wherein $R^1$ is a $C_1$-$C_{18}$ organic group, $R^3$ is each independently a $C_1$-$C_6$ organic group, and a is an integer of 0 to 2, or a (partial) hydrolytic condensate thereof, and (B) a reactive UV absorber comprising an alkoxysilyl-containing benzophenone or a (partial) hydrolytic condensate thereof, (2) particulate silicon dioxide, (3) a siloxane resin having the average compositional formula (2):

$$R^2_b Si(OR^3)_c (OH)_d O_{(4-b-c-d)/2} \quad (2)$$

wherein $R^2$ is each independently a $C_1$-$C_{18}$ organic group, $R^3$ is each independently a $C_1$-$C_6$ organic group, b, c and d are numbers in the range: $0.8 \leq b \leq 1.5$, $0 \leq c \leq 0.3$, $0.001 \leq d \leq 0.5$, and $0.801 \leq b+c+d < 2$, the siloxane resin being solid at or below 40° C. and having a weight average molecular weight of at least 2,000, and (4) a cure catalyst.

More preferably, component (B) is a reactive UV absorber comprising an alkoxysilyl-containing benzophenone having the general formula (I):

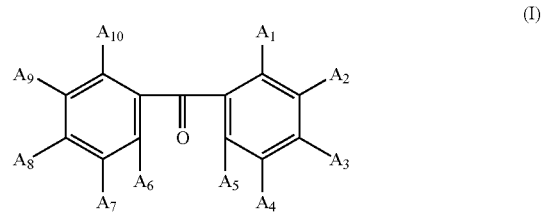

wherein $A_1$ to $A_{10}$ are each independently hydrogen, hydroxyl, $C_1$-$C_5$ alkyl, or a group of the general formula (II):

$$-O-(CH_2)_{m+2}-SiR^{11}_n(OR^{12})_{3-n} \quad (II)$$

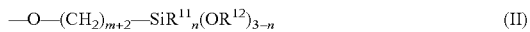

wherein $R^{11}$ and $R^{12}$ are each independently $C_1$-$C_5$ alkyl, m is an integer of 1 to 5, and n is an integer of 0 to 2, at least one of $A_1$ to $A_{10}$ being a group of formula (II).

More preferably, components (1) and (2) are present as a product obtained from hydrolytic condensation of components (A) and (B) and component (2) in the presence of an acidic catalyst.

The UV-absorptive coating composition may further comprise (5) the reaction product of a titanium tetraalkoxide with a β-diketone and/or a hydrolytic condensate of a mixture of a titanium tetraalkoxide and a β-diketone.

Typically, the substrate comprises a polycarbonate resin.

Advantageous Effects of Invention

The plastic article for automotive glazing is covered with a coating of resin layers which exhibits mar resistance and UV screening property while maintaining visible light transparency, and which possesses sufficient weather resistance and durability to withstand long-term outdoor exposure.

Since the plastic article, typically polycarbonate resin substrate covered with resin layers as specified herein is characterized by lightweight, transparency, mar resistance, weather resistance and chemical resistance, it is best suited as glazing in vehicles or the like in the outdoor use application where it is exposed to UV.

DESCRIPTION OF EMBODIMENTS

The singular forms "a," "an" and "the" include plural referents unless the context clearly dictates otherwise. The notation (Cn-Cm) means a group containing from n to m carbon atoms per group. UV refers to the ultraviolet region of the electromagnetic spectrum. Mw refers to a weight average molecular weight as measured by gel permeation chromatography (GPC) versus polystyrene standards. The terminology "(meth)acrylate" refers collectively to acrylate and methacrylate.

According to the invention, a plastic article for automotive glazing is characterized as comprising at least two resin layers on a surface of a plastic substrate. The at least two resin layers include a first or primer layer which is disposed adjacent the substrate surface, specifically contiguous to the substrate surface if the resin layers are two, and a second or hard top layer which is disposed on the first layer, specifically contiguous to the first layer if the resin layers are two. The first or primer layer is a cured resin layer comprising a vinyl copolymer having alkoxysilyl and UV-absorptive groups and particulate silicon dioxide. The second or hard top layer is a cured resin layer of an organopolysiloxane composition comprising a hydrolytic mixture or co-hydrolyzate of organosilicon compounds containing a UV-absorptive organoxysilane and particulate silicon dioxide.

Differently stated, the invention provides a plastic article for automotive glazing comprising a UV-absorbing hard top layer and a UV-absorbing primer layer in combination, wherein the combination imparts UV absorbing ability and mar resistance to the plastic article.

Now the plastic article is described in more detail.

Substrate

The substrate used herein may be selected from molded plastics, and composites of plastics with ceramics, glass or metals. Various plastic materials or organic resin substrates are advantageously used. Inter alia, plastic substrates of polycarbonate, polystyrene, acrylic resins, ABS resins, and vinyl chloride resins, for example, are preferred, with polycarbonate resins being most preferred.

These resin substrates which have been surface treated, specifically by conversion treatment, corona discharge treatment, plasma treatment, acid or alkaline treatment are also useful. Also included are laminated substrates comprising a resin substrate and a surface layer formed thereon from a resin of different type from the substrate. Exemplary laminated substrates include those consisting of a polycarbonate resin substrate and a surface layer of acrylic resin or urethane resin which are prepared by co-extrusion or lamination technique, and those consisting of a polyester resin substrate and a surface layer of acrylic resin formed thereon.

First Layer (Primer Layer)

The first or primer layer is a cured layer of a coating composition or primer composition. The primer composition essentially comprises a UV-absorbing vinyl copolymer and particulate silicon dioxide. The vinyl copolymer is preferably formed using (a) a UV-absorptive vinyl monomer, (b) an alkoxysilyl-containing vinyl monomer, and (c) another vinyl monomer. More specifically, the vinyl copolymer is a vinyl resin obtained from copolymerization of 1 to 30% by weight of the UV-absorptive vinyl monomer (a), 1 to 30% by weight of the alkoxysilyl-containing vinyl monomer (b), and 40 to 98% by weight of the other vinyl monomer (c).

The UV-absorbing vinyl monomer (a) may be any monomer having at least one UV-absorptive group and at least one vinyl group in a molecule. Examples of the UV-absorptive vinyl monomer (a) include benzotriazole compounds of the general formula (3) and benzophenone compounds of the general formula (4), both shown below.

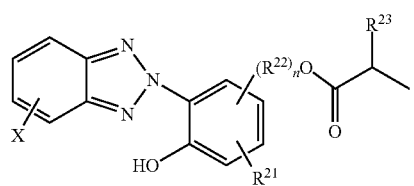

(3)

Herein X is hydrogen or chlorine, $R^{21}$ is hydrogen, methyl, or $C_4$-$C_8$ tertiary alkyl group, $R^{22}$ is a straight or branched $C_2$-$C_{10}$ alkylene group, $R^{23}$ is hydrogen or methyl, and n is 0 or 1.

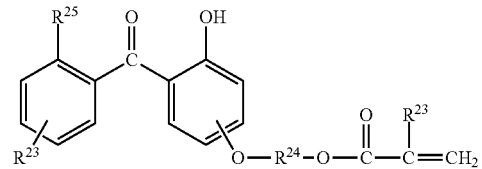

(4)

Herein $R^{23}$ is as defined above, $R^{24}$ is a substituted or unsubstituted, straight or branched $C_2$-$C_{10}$ alkylene group, and $R^{25}$ is hydrogen or hydroxyl.

Illustrative non-limiting examples of the benzotriazole compound of formula (3) include 2-(2'-hydroxy-5'-(meth)acryloxyphenyl)-2H-benzotriazole, 2-(2'-hydroxy-3'-tert-butyl-5'-(meth)acryloxymethylphenyl)-2H-benzotriazole, 2-[2'-hydroxy-5'-(2-(meth)acryloxyethyl)phenyl]-2H-benzotriazole, 2-[2'-hydroxy-3'-tert-butyl-5'-(2-(meth)acryloxyethyl)-phenyl]-5-chloro-2H-benzotriazole, and 2-[2'-hydroxy-3'-methyl-5'-(8-(meth)acryloxyoctyl)phenyl]-2H-benzotriazole.

Illustrative non-limiting examples of the benzophenone compound of formula (4) include 2-hydroxy-4-(2-(meth)acryloxyethoxy)benzophenone, 2-hydroxy-4-(4-(meth)acryloxybutoxy)benzophenone, 2,2'-dihydroxy-4-(2-(meth)acryloxyethoxy)benzophenone, 2,4-dihydroxy-4'-(2-(meth)acryloxyethoxy)benzophenone, 2,2',4-trihydroxy-4'-(2-(meth)acryloxyethoxy)benzophenone, 2-hydroxy-4-(3-(meth)acryloxy-2-hydroxypropoxy)benzophenone, and 2-hydroxy-4-(3-(meth)acryloxy-1-hydroxypropoxy)-benzophenone.

The preferred UV-absorbing vinyl monomers are benzotriazole compounds of formula (3), with 2-[2'-hydroxy-5'-(2-(meth)acryloxyethyl)phenyl]-2H-benzotriazole being most preferably used.

The alkoxysilyl-containing vinyl monomer (b) is a compound having an alkoxysilyl group and a vinyl-containing monovalent hydrocarbon group. Of vinyl-containing monovalent hydrocarbon groups, vinyl, allyl, 3-acryloxypropyl, 3-methacryloxypropyl, and p-vinylphenyl are preferred for availability of reactants and ease of synthesis. Suitable alkoxysilyl groups include trialkoxyl, dialkoxyl, and monoalkoxyl groups. The desired vinyl monomers include vinyl monomers having a trialkoxysilyl group. The number of hydrolyzable groups is an integer of 1, 2 or 3, while inclusion of 2 or 3 hydrolyzable groups is preferred for quick formation of a network structure, with 3 being most preferred.

Examples of the alkoxysilyl-containing vinyl monomer (b) include vinyltrimethoxysilane, vinyltriethoxysilane, vinyltris(ethoxyethoxy)silane, allyltrimethoxysilane, allyltriethoxysilane, allyltris(ethoxyethoxy)silane, 3-acryloxypropyltrimethoxysilane, 3-acryloxypropyltriethoxysilane, 3-acryloxypropyltris(ethoxyethoxy)silane, 3-methacryloxypropyltrimethoxysilane, 3-methacryloxypropyltriethoxysilane, and 3-methacryloxypropyltris(ethoxyethoxy)silane.

Examples of the other vinyl monomer (c) include alkyl (meth)acrylates such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate, 2-ethylhexyl acrylate, and 2-ethylhexyl methacrylate; vinyl aromatic hydrocarbons such as styrene, vinyltoluene, and α-methylstyrene; vinyl halides such as vinyl chloride and vinylidene chloride;

conjugated dienes such as butadiene and isoprene; and vinyl esters of $C_1$-$C_{12}$ saturated fatty acids such as vinyl acetate and vinyl propionate.

The vinyl copolymer used herein may be obtained by combining components (a), (b) and (c) in an organic solvent, and effecting reaction at room temperature to the reflux temperature of the solvent, preferably 50 to 150° C., in the presence of a free radical initiator. The type and amount of the solvent used may be the same as the organic solvent to be described later.

Suitable free radical initiators include azo compounds and organic peroxides. Examples include azobisisobutyronitrile, t-butyl hydroperoxide, cumene hydroperoxide, di-t-butyl peroxide, dicumyl peroxide, benzoyl peroxide, t-butyl perbenzoate, and acetone peroxide.
Although the amount of the free radical initiator used is not particularly limited, an appropriate amount is 0.01 to 1% by weight based on the total weight of components (a), (b) and (c).

In the polymerization process, a chain transfer agent such as n-propane thiol, 1-hexane thiol, 1-decane thiol, benzene thiol, 3-mercaptopropyltrimethoxysilane, or 3-mercaptopropyltriethoxysilane may be used for controlling the molecular weight.

With respect to the contents of components (a), (b) and (c) in the copolymer, it is preferred that the content of component (a) be 1 to 30% by weight and the content of component (b) be 1 to 30% by weight, based on the total weight of components (a), (b) and (c). A content of component (a) below the range may lead to reduced UV screening property whereas a content of component (a) exceeding the range may adversely affect the adhesion between the primer layer and the hard top layer. A content of component (b) below the range may adversely affect the adhesion between the primer layer and the hard top layer whereas a content of component (b) exceeding the range may lead to a brittle primer layer.

Preferably the vinyl copolymer is dissolved in a solvent prior to use. The solvent used herein is not particularly limited as long as the copolymer obtained from components (a), (b) and (c) is dissolvable therein. A solvent mainly comprising a highly polar organic solvent is preferred. Exemplary solvents include alcohols such as methanol, ethanol, isopropyl alcohol, n-butanol, isobutanol, t-butanol, and diacetone alcohol; ketones such as methyl propyl ketone, diethyl ketone, methyl isobutyl ketone, and cyclohexanone; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as ethyl acetate, propyl acetate, butyl acetate, and cyclohexyl acetate. The solvents may be used alone or in admixture.

The solvent is preferably added in such an amount that the coating composition may have a solids concentration of 1 to 30% by weight, more preferably 5 to 25% by weight. Outside the range, a coating obtained by applying the composition and curing may be defective. A concentration below the range may lead to a coating which is likely to sag, wrinkle or mottle, failing to provide the desired hardness and mar resistance. A concentration beyond the range may lead to a coating which is susceptible to brushing, whitening or cracking.

The other essential component in the primer layer is particulate silicon dioxide. Contemplated herein is a dispersion of silicon dioxide fine particles in an organic solvent.

Particulate silicon dioxide is added in order to reduce the coefficient of linear expansion of the primer layer. A colloidal dispersion of nano-size particulate silicon dioxide in a medium or organic solvent is typical. Any commercially available dispersions of organic solvent type are useful.

Particulate silicon dioxide is not particularly limited as long as it can be dispersed in an organic solvent and the primer composition (coating composition) having particulate silicon dioxide added thereto can be cured into a primer layer having a coefficient of linear expansion of up to $150 \times 10^{-6}/°$ C. Since silicon dioxide fine particles have SiOH groups on their surfaces, they form siloxane crosslinks with hydrolyzable silyl groups and/or SiOH groups in the vinyl polymer to form an organic/inorganic composite. As a result, the coefficient of linear expansion of the primer layer is reduced to $150 \times 10^{-6}/°$ C. or below.

Examples of the organic solvent in which silicon dioxide fine particles are dispersed include methanol, ethanol, isopropanol, n-butanol, ethylene glycol, ethyl cellosolve, butyl cellosolve, propylene glycol monomethyl ether, propylene glycol monomethyl ether acetate (PGMEA), dimethylformamide, dimethylacetamide, methyl ethyl ketone, methyl isobutyl ketone, and xylene/n-butanol mixture. With the solubility of the vinyl polymer taken into account, preference is given to ethylene glycol, ethyl cellosolve, butyl cellosolve, propylene glycol monomethyl ether, PGMEA, methyl ethyl ketone, and methyl isobutyl ketone.

The silicon dioxide fine particles preferably have a primary particle size of 1 to 100 nm, more preferably 2 to 50 nm, when the dispersion thereof in the primer composition and the transparency of the primer layer are taken into account. Silicon dioxide fine particles with a particle size in excess of 100 nm may have poor dispersion stability in the composition and substantially detract from the transparency of a cured coating.

As the silicon dioxide fine particles dispersed in organic solvents, colloidal silica dispersed in organic solvent, also referred to as organosilica sol, is preferred. Examples include ethylene glycol-dispersed silica sol, ethylene glycol/mono-n-propyl ether-dispersed silica sol, ethyl cellosolve-dispersed silica sol, butyl cellosolve-dispersed silica sol, propylene glycol monomethyl ether-dispersed silica sol, PGMEA-dispersed silica sol, methyl ethyl ketone-dispersed silica sol, and methyl isobutyl ketone-dispersed silica sol. The silicon dioxide fine particles dispersed in organic solvents may be used alone or in admixture of more than one type.

Notably the colloidal silica dispersed in organic solvent is commercially available. Exemplary commercial products include PMA-ST (used in Examples to be described later), MEK-ST, MIBK-ST, IPA-ST-L, IPA-ST-MS, EG-ST-ZL, DMAC-ST-ZL, and XBA-ST (Nissan Chemical Industries, Ltd.), OSCAL 1132, 1332, 1532, 1722, and EOMST-1003SIV (JGC C&C).

In the primer composition (or coating composition), the vinyl polymer having a hydrolyzable silyl group and/or SiOH group and an organic UV-absorptive group attached to side chains and the particulate silica dispersed in organic solvent are preferably combined such that 0.1 to 100 parts, more preferably 1 to 50 parts by weight of particulate silica as solids be present per 100 parts by weight of the vinyl polymer as resin content. On this basis, if particulate silicon dioxide is added in excess of 100 pbw, then the primer composition may have too high a crosslinking density and form a primer coating having so high a hardness as to adversely affect the adhesion thereof to the substrate or the overlying polysiloxane coating. If the amount of particulate silicon dioxide is less than 0.1 pbw, then the primer composition may have too low a crosslinking density to form a primer coating having a coefficient of linear expansion of up to $150\times10^{-6}/°$ C., failing to provide the desired adhesion and crack resistance.

In another embodiment, the primer composition (or coating composition) may comprise an organic/inorganic composite resulting from reaction of the vinyl polymer having a hydrolyzable silyl group and/or SiOH group and an organic UV-absorptive group attached to side chains with the particulate silicon dioxide dispersed in organic solvent. When the vinyl polymer and the particulate silicon dioxide are previously reacted to form an organic/inorganic composite, the primer composition or coating composition may provide less adhesion to the substrate upon curing because cure has proceeded to some extent.

Reaction of the vinyl polymer having a hydrolyzable silyl group and/or SiOH group and an organic UV-absorptive group attached to side chains with the particulate silicon dioxide dispersed in organic solvent can occur in the presence of water or by heating at 30 to 120° C., more specifically 40 to 80° C. for 0.5 to 12 hours, more specifically 1 to 10 hours. Such reaction may detract from the stability of solution composition. In such a situation, inclusion of a dehydrating agent is desired.

The dehydrating agent used herein may be any compound which reacts with water to consume it. Suitable dehydrating agents include orthoformic esters, orthoacetic esters, and carbodiimides. Inter alia, methyl orthoformate, ethyl orthoformate, and propyl orthoformate are readily available.

An appropriate amount of the dehydrating agent used is 0.1 to 100 parts, more preferably 1 to 50 parts by weight per 100 parts by weight of the resin content in the primer composition or coating composition as long as it can react with any externally entrained water.

The inclusion of dehydrating agent ensures that hydrolyzable silyl groups remain stable in the solution, effectively bond with hydrolyzable silyl groups and/or SiOH groups in the hard top layer after coating formation, and form crosslinks with hydrolyzable silyl groups and/or SiOH groups in the vinyl copolymer having a UV-absorptive group attached to a side chain. As a result, the coating is densified enough to prevent cracking and effective in fixing the UV absorber or the like within the coating layer.

Hard Top Layer

The second layer or hard top layer is composed of a UV-absorptive coating composition comprising the following components (1) to (4):

(1) (A) at least one hydrolyzable silicon compound having the general formula (1):

wherein $R^1$ is a $C_1$-$C_{18}$ organic group, $R^3$ is each independently a $C_1$-$C_6$ organic group, and a is an integer of 0 to 2, or a (partial) hydrolytic condensate thereof, and (B) a reactive UV absorber comprising an alkoxysilyl-containing benzophenone or a (partial) hydrolytic condensate thereof, (2) particulate silicon dioxide, (3) a siloxane resin having the average compositional formula (2):

wherein $R^2$ is each independently a $C_1$-$C_{18}$ organic group, $R^3$ is each independently a $C_1$-$C_6$ organic group, b, c and d are numbers in the range: $0.8 \leq b \leq 1.5$, $0 \leq c \leq 0.3$, $0.001 \leq d \leq 0.5$, and $0.801 \leq b+c+d<2$, the siloxane resin being solid at or below 40° C. and having a weight average molecular weight of at least 2,000, and (4) a cure catalyst.

The components of the hard top layer-forming composition are described in detail.

Component (1)-(A)

Component (A) in the hard top layer-forming composition or coating composition is at least one hydrolyzable silicon compound having the general formula (1) or a (partial) hydrolytic condensate thereof.

Herein $R^1$ is a $C_1$-$C_{18}$ organic group, $R^3$ is each independently a $C_1$-$C_6$ organic group, and a is an integer of 0 to 2.

In formula (1), $R^1$ is a $C_1$-$C_{18}$ organic group, preferably a substituted or unsubstituted, monovalent hydrocarbon group of 1 to 10 carbon atoms. Suitable monovalent hydrocarbon groups include linear, branched or cyclic alkyl groups such as methyl, ethyl, propyl, butyl, hexyl, decyl, cyclohexyl, and 1,1,2-trimethylpropyl, aryl groups such as phenyl and tolyl, aralkyl groups such as benzyl and phenylethyl, and alkenyl groups such as vinyl, allyl, propenyl and butenyl. Inter alia, alkyl groups are preferred for use in the application where mar resistance and weather resistance are required, with methyl being most preferred.

$OR^3$ is a hydrolyzable group, typically of 1 to 6 carbon atoms. Suitable hydrolyzable groups are organoxy groups including alkoxy groups such as methoxy, ethoxy, propoxy, and butoxy, isopropenoxy, and phenoxy. Inter alia, $C_1$-$C_4$ alkoxy groups are preferred for process amenability and ease of distillation of by-products, with methoxy and ethoxy being most preferred. In view of the hardness, wear resistance and adhesion of the hard top composition, it is preferred that the hydrolyzable silicon compound (A) comprise at least 40 mol % of a trifunctional hydrolyzable silane (silane of formula (1) wherein a=1).

Examples of the hydrolyzable silicon compound include methyltrimethoxysilane, methyltriethoxysilane, methyltriisopropoxysilane, methyltributoxysilane, ethyltrimethoxysilane, ethyltriethoxysilane, propyltrimethoxysilane, propyltriethoxysilane, butyltrimethoxysilane, phenyltrimethoxysilane, and cyclohexyltrimethoxysilane.

Component (1)-(B)

Component (B) is a reactive UV absorber comprising an alkoxysilyl-containing benzophenone derivative or a (partial) hydrolytic condensate thereof. Desirably, it is a reactive UV absorber in the form of a benzophenone derivative having at least two alkoxysilyl groups, represented by the general formula (1):

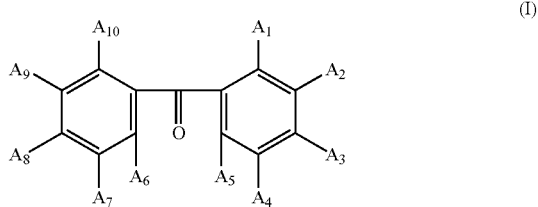

wherein $A_1$ to $A_{10}$ are each independently hydrogen, hydroxyl, $C_1$-$C_5$ alkyl, or a group of the general formula (II), at least one, preferably at least two of $A_1$ to $A_{10}$ being a group of formula (II).

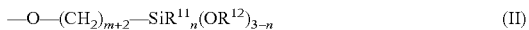

$$—O—(CH_2)_{m+2}—SiR^{11}{}_n(OR^{12})_{3-n} \quad (II)$$

Herein $R^{11}$ and $R^{12}$ are each independently $C_1$-$C_5$ alkyl, m is an integer of 1 to 5, and n is an integer of 0 to 2.

The reactive UV absorber may be prepared by reacting a benzophenone compound having at least two hydroxyl groups (III) with an allyl compound (IV) to synthesize an allyl-containing benzophenone compound, and further reacting it with a hydroxyl-containing alkoxysilane (V) in the presence of a platinum catalyst.

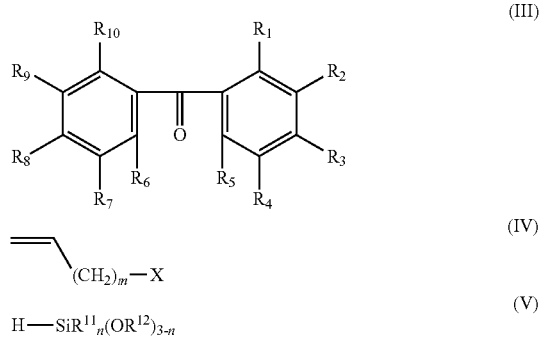

In formula (III), $R_1$ to $R_{10}$ are each independently hydrogen, $C_1$-$C_5$ alkyl, or hydroxyl, at least two of $R_1$ to $R_{10}$ being hydroxyl. In formula (IV), X is a halogen such as iodine, bromine or chlorine, and m is an integer of 1 to 5. In formula (V), $R^{11}$ and $R^{12}$ are each independently $C_1$-$C_5$ alkyl, m is an integer of 1 to 5, and n is an integer of 0 to 2.

The reactant, benzophenone compound having at least two hydroxyl groups represented by formula (III) may be readily prepared as polyhydroxybenzophenone by reacting a phenol having at least two hydroxyl groups with an aromatic carboxylic acid. See JP-A H05-70397, for example. Examples of suitable benzophenone compounds include 4,4'-dihydroxybenzophenone, 2,4-dihydroxybenzophenone, 2,3,4-trihydroxybenzophenone, 2,4,4'-trihydroxybenzophenone, 2,2',4-trihydroxybenzophenone, 2,2',3,4-tetrahydroxybenzophenone, 2,3,4,4'-tetrahydroxybenzophenone, 2,2',4,4'-tetrahydroxybenzophenone, 2,2',3,4,4'-pentahydroxybenzophenone, 2,3-dihydroxy-4-methoxybenzophenone, 2,2'-dihydroxy-4-methoxybenzophenone, 2,4-dihydroxy-4'-methoxybenzophenone, 2,2'-dihydroxy-3,4-dimethoxybenzophenone, 2,3-dihydroxy-4,4'-dimethoxybenzophenone, 2,2'-dihydroxy-4,4'-dimethoxybenzophenone, 4-methoxy-2,2',4'-trihydroxybenzophenone, 4-methoxy-2',3',4'-trihydroxybenzophenone, 4-butoxy-2,2',4'-trihydroxybenzophenone, and 3,4-dimethoxy-2,2',4'-trihydroxybenzophenone.

The benzophenone compound of formula (I) may be prepared by reacting the polyhydroxybenzophenone with an allyl halide. More specifically, the benzophenone compound of formula (I) may be synthesized by reacting a compound of formula (III) with a compound of formula (IV) such as allyl chloride, allyl bromide or allyl iodide in an inert solvent such as a ketone, ester or ether in the presence of a base such as an alkali metal hydroxide, alkaline earth metal hydroxide, alkali metal alkoxide, alkaline earth metal alkoxide, alkali metal carbonate, alkaline earth metal carbonate, or amine. The reaction may be carried out at room temperature to about 200° C., preferably 50 to 150° C. Typically the reaction runs to completion within about 30 minutes to about 10 hours when the reaction temperature is about 120° C. The reaction product has the general formula (VI).

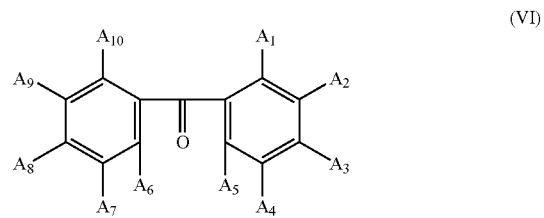

Herein $A_1$ to $A_{10}$ are each independently hydrogen, hydroxyl, $C_1$-$C_5$ alkyl, or a group of the formula: $—O—(CH_2)_m—CH=CH_2$ wherein m is an integer of 1 to 5, at least one, preferably at least two of $A_1$ to $A_{10}$ being a group $—O—(CH_2)_m—CH=CH_2$.

The compound of formula (VI) is then reacted with a hydrosilane compound of formula (V) in the presence of a platinum catalyst, optionally in an inert solvent such as toluene or tetrahydrofuran, or in a solventless system, thereby synthesizing the compound of formula (I).

The hydrosilane compound of formula (V) used herein is a hydrosilane compound having 1 to 3 methoxy, ethoxy, propoxy, butoxy or pentoxy groups. Inter alia, trimethoxysilane and triethoxysilane are preferred.

The reaction may be carried out at room temperature to about 200° C., preferably 25 to about 100° C. When trimethoxysilane is used, the reaction may terminate within about 30 minutes to about 2 hours when the reaction temperature is room temperature to about 60° C. The reaction product has the general formula (I).

The silylated UV absorber used herein, specifically polyhydroxy-poly(trialkoxysilylalkoxy)benzophenone or poly(trialkoxysilylalkoxy)benzophenone, may be prepared as follows, for example.

First, an allyl halide and potassium carbonate are reacted with a polyhydroxybenzophenone in an organic solvent to form a polyhydroxy-polyallyloxybenzophenone or polyallyloxybenzophenone.

The resulting benzophenone is reacted with a hydroalkoxysilane in the presence of a platinum catalyst to form a polyhydroxy-poly(alkoxysilylalkoxy)benzophenone or poly(alkoxysilylalkoxy)benzophenone. At this point, all hydroxyl groups may be converted to allyl groups and then to alkoxysilylalkoxy groups, or some hydroxyl groups may be left as such. Since a benzophenone compound having some hydroxyl groups left tends to have significant absorption properties in the UV-A region and hence, high UV absorption ability, it is susceptible to yellowing as a result of the absorption wavelength region being broadened to the visible region, and also susceptible to gelation through potential reaction with an alkoxysilyl group to attain a molecular weight buildup. For this reason, the remaining hydroxyl groups are desirably less than or equal to 2 moles per molecule. This drawback can be eliminated by silylating hydroxyl groups.

Although the amount of hydroalkoxysilane used may be 1 to 1.2 moles per mole of allyloxy group when polyallyloxybenzophenone is used, the amount of hydroalkoxysilane used should be at least 1.1 moles, desirably at least 1.2 moles per mole of allyloxy group when polyhydroxy-polyallyloxybenzophenone is used. This is because some hydroxyl groups are converted to alkoxysiloxy. The maximum amount is the total moles of allyloxy and hydroxy groups. By converting some hydroxy groups into alkoxysiloxy groups, a phenomenon of gelation due to a molecular weight buildup may be inhibited.

The reactive UV absorber has a benzophenone structure in the molecule, which contributes to UV absorption. It also has an alkoxy group at the molecular end, which undergoes hydrolysis to form a reactive silanol, which in turn, undergoes condensation polymerization to attain a molecular weight buildup by itself or to bond with another binder component. Notably the curable UV absorber may also be present in the form of an oligomer which is obtained from hydrolysis of some alkoxyl groups and condensation polymerization of the resulting silanol.

Component (2)

Component (2) is particulate silicon dioxide. It is believed to play the role of a filler for imparting hardness and wear resistance to a coating as well as the role of a crosslinker for forming on particle surfaces bonds with organoxy or silanol groups in components (A) and (B) as the binder. Specifically, hydroxyl groups (Si—OH) are present on surfaces of particles, and such hydroxyl groups can form bonds (Si—O—Si) with components (A) and (B). The particulate silicon dioxide is preferably used as dispersed in a dispersing medium (oxide sol), typically in the form of a colloidal dispersion of silicon dioxide, that is, colloidal silica. The dispersing medium is preferably a polar solvent such as water or alcohols.

The silicon dioxide fine particles used herein may be of any desired particle size as long as particles are fine enough to maintain the coating transparent. The preferred particle size is in a range of 1 to 300 nm, more preferably 1 to 100 nm. Silicon dioxide particles may be partially treated and coated with a silane coupling agent, a tetraalkoxysilane such as tetraethoxysilane, a titanium coupling agent, or a carboxyl-containing organic polymer for the purpose of enhancing the dispersion stability of particles. It is noted that component (2) is composed mainly of inorganic silicon dioxide, while the content of the organic matter which is added for stabilization and used for coating is preferably up to 10% by weight.

An appropriate amount of component (2) used is 5 to 300 parts, more preferably 5 to 100 parts by weight per 100 parts by weight of components (A) and (B) combined.

In a preferred embodiment, components (1) and (2) are present as a product obtained from hydrolytic condensation of components (A) and (B) and component (2) in the presence of an acidic catalyst.

Components (A), (B) and (2) are preferably prepared by adding a water dispersion of silicon dioxide as component (2) to a hydrolyzable silicon compound, reactant for components (A) and (B). This means that components (A) and (B) are prepared in the co-presence of component (2). This process ensures effective preparation when an acidic or alkaline water-dispersed silicon dioxide sol is used. In the invention, an acidic water-dispersed silicon dioxide sol is preferably used. When this process is employed, water in the water-dispersed silicon dioxide sol is preferably at least 1 mole, more preferably at least 1.2 moles per mole of hydrolyzable group $OR^3$. If water is less than 1 mole, some hydrolyzable groups are left behind as described above, leading to a lowering of crosslinking density and detracting from hardness and adhesion. The upper limit of water amount is not critical although the water amount is usually up to 10 moles, typically up to 5 moles.

A hydrolytic catalyst may be used during the preparation. The hydrolytic catalyst used herein may be selected from prior art well-known catalysts including acidic hydrogen halides, carboxylic acids, sulfonic acids, acidic or weakly acidic oxides and inorganic salts, and solid acids such as ion exchange resins. Suitable catalysts include organic acids such as acetic acid and maleic acid, and cation exchange resins having sulfonic acid groups or carboxylic acid groups on their surfaces. The hydrolytic catalyst is preferably used in an amount of 0.001 to 10 mol % based on the moles of hydrolyzable group $OR^3$. Hydrolysis is preferably carried out under weakly acidic conditions, typically at a pH value in the range of 2 to 7. If hydrolysis is carried out otherwise, the resulting silanol groups may remain unstable, allowing condensation reaction to further proceed to invite a molecular weight buildup.

To provide the hard top film with a higher hardness, the hydrolysis must be followed by condensation. Condensation may be carried out subsequent to hydrolysis in a continuous manner, typically at room temperature or while heating at a temperature below 100° C. A temperature above 100° C. may cause gelation. Condensation may be promoted by distilling off the alcohol resulting from hydrolysis at or above 80° C. and atmospheric or subatmospheric pressure. Moreover, a condensation catalyst such as a basic compound, acidic compound or metal chelate may be added for the purpose of promoting condensation. Prior to or during the condensation step, an organic solvent may be added for the purpose of adjusting the progress of condensation or the concentration. Also a dispersion of metal oxide particles in water or organic solvent, typically silicon dioxide sol may be added. Generally stated, with a progress of condensation, a silicone resin builds up its molecular weight and reduces its solubility in water or formed alcohol. Thus the organic solvent added herein is preferably a relatively polar organic solvent having a boiling point of at least 80° C. in which the product is fully dissolvable. Suitable organic solvents include alcohols such as isopropyl alcohol, n-butanol, isobutanol, t-butanol, and diacetone alcohol; ketones such as methyl propyl ketone, diethyl ketone, methyl isobutyl ketone, and cyclohexanone; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as propyl acetate, butyl acetate, and cyclohexyl acetate.

The silicone product resulting from condensation should preferably have a weight average molecular weight (Mw) of at least 1,500, more preferably 1,500 to 50,000, and even more preferably 2,000 to 20,000, as measured by GPC versus polystyrene standards. A silicone product with a Mw below the range may form a coating which is less tough and prone to crack whereas a silicone product with a Mw beyond the range tends to have a low hardness and may cause a whitening problem to a coating because the resin undergoes phase separation in the coating.

Component (3)

Component (3) is a siloxane resin having the average compositional formula (2):

$$R^2{}_b Si(OR^3)_c(OH)_d O_{(4-b-c-d)/2} \qquad (2)$$

wherein $R^2$ is each independently a $C_1$-$C_{18}$ organic group, $R^3$ is each independently a $C_1$-$C_6$ organic group, b, c and d are numbers in the range: $0.8 \leq b \leq 1.5$, $0 \leq c \leq 0.3$, $0.001 \leq d \leq 0.5$, and $0.801 \leq b+c+d<2$.

The siloxane resin functions to impart flexibility to the hard topcoat film to prevent cracks or the like while maintaining the high hardness of the film. This function is obtainable because component (3) has a relatively small amount of terminal groups ($OR^3$ and OH), participates in the crosslinking reaction of the hard topcoat composition to a limited extent, and plays the role of a buffer for filling the interstices of crosslinking network therewith. If the amount of terminal groups is too small, the siloxane resin is not tenaciously fixed within the coating, which is detrimental to solvent resistance or the like. Therefore, the siloxane resin as component (3) should have an amount of terminal groups which is relatively small, but enough to form bonds with components (A), (B) and (2) to a limited extent so that it may be fixed within the hard topcoat film.

In formula (2), $R^2$ is each independently an organic group of 1 to 18 carbon atoms, preferably 1 to 10 carbon atoms. Suitable organic groups include substituted or unsubstituted, monovalent hydrocarbon groups, for example, alkyl, aryl, aralkyl, alkenyl, and halo-substituted alkyl groups, with the alkyl and aryl groups being preferred. Exemplary groups include methyl, ethyl, propyl, butyl, hexyl, octyl, decyl, cyclopentyl, cyclohexyl, phenyl, vinyl, and trifluoropropyl. $R^3$ is each independently a $C_1$-$C_6$ organic group, typically alkyl or alkenyl. $OR^3$ represents a terminal group on the siloxane resin other than the silanol group (Si—OH). Suitable terminal groups include methoxy, ethoxy, propoxy and butoxy, with methoxy and ethoxy being preferred for the availability of reactants.

The subscripts b, c and d are numbers in the range: $0.8 \leq b \leq 1.5$, $0 \leq c \leq 0.3$, $0.001 \leq d \leq 0.5$, and $0.801 \leq b+c+d < 2$. If b indicative of the content of $R^2$ is less than 0.8, then crack resistance drops. If b exceeds 1.5, then the resin becomes more hydrophobic due to more organic groups and less compatible with the hard topcoat layer so that it may bleed out of the film, losing the crack-preventing effect and causing appearance defectives like cissing. If c indicative of the content of $OR^3$ exceeds 0.3, which means a more amount of terminal groups, then the resin participates in condensation reaction with components (A), (B) and (2) in a higher proportion, failing to exert the crack-preventing effect. The content of alkoxy and other groups can be quantitatively determined by infrared absorption spectroscopy or the alcohol determination method based on alkali cracking. If d indicative of the content of OH exceeds 0.5, then the resin participates in condensation reaction with components (A), (B) and (2) upon heat curing in a higher proportion, leading to a high hardness and a lack of crack resistance. If d is less than 0.001, then the resin does not at all form bonds with components (A), (B) and (2) and is not fixed within the film, leading to drops of hardness and solvent resistance.

More preferably, b, c and d are in the range: $0.9 \leq b \leq 1.3$, $0.001 \leq c \leq 0.2$, $0.01 \leq d \leq 0.3$, and $0.911 \leq b+c+d \leq 1.8$. These values of b, c and d can be determined by analyzing a resin by $^{29}$Si-NMR spectroscopy and computing the average chemical structure for the resin. For structural units (T0 to T3) of four types shown below among T units ($RSiO_{3/2}$) synthesized from a trifunctional hydrolyzable silane, for example, signals are observed at different chemical shifts in the $^{29}$Si-NMR spectrum. Since the area of this signal indicates an abundance ratio of the corresponding structure, the structure of a siloxane resin can be computed from the abundance ratio and the amount of residual alkoxy groups determined from an IR spectrum. In general, a siloxane resin may be represented by a combination of Q unit ($SiO_{4/2}$) derived from a tetrafunctional silane, T unit ($R^2SiO_{3/2}$) derived from a trifunctional silane, D unit ($R^2SiO_{2/2}$) derived from a difunctional silane, and M unit ($R^2SiO_{1/2}$) derived from a monofunctional silane. When component (3) is represented by this nomenclature, a proportion of moles of T units ($R^2SiO_{3/2}$) is preferably at least 70 mol % based on the total moles of all siloxane units. If a proportion of T units is less than 70 mol %, an overall profile of hardness, wear resistance, adhesion, coatability, and appearance may be disrupted. The balance may consist of M, D and Q units, and the sum of these units being preferably up to 30 mol %.

The siloxane resin as component (3) is solid at or below 40° C. When the siloxane resin is liquid at or below 40° C., the coating may have a low hardness and low solvent resistance even if bonds form between the siloxane resin as component (3) and components (A), (B) and (2) upon heat curing. The siloxane resin as component (3) should preferably have a volatile content of up to 2% by weight upon drying at 105° C. for 3 hours. A siloxane resin with a volatile content of more than 2% by weight, which is solid, may flow or fuse at or below 40° C. and be inconvenient to work. Preferably the siloxane resin has a softening point of 60 to 90° C. If the softening point is lower than 60° C., then the hard topcoat film may have a low hardness and low wear resistance. If the softening point exceeds 90° C., the compatibility with components (A), (B) and (2) and crack resistance may be reduced. It is noted that the softening point is measured by the ring-and-ball test according to JIS K-2207.

The molecular weight of a siloxane resin may be measured by GPC. The siloxane resin has a weight average molecular weight (Mw) of at least 2,000, preferably 2,000 to 10,000 as measured by GPC versus polystyrene standards. A siloxane resin with a Mw of less than 2,000 may participate in crosslinking due to too much terminal groups, lacking the crack-preventing effect. A siloxane resin with too high a Mw may be less compatible with components (A), (B) and (2), resulting in an opaque coating.

For the preparation of the siloxane resin as component (3), a prior art well-known resin preparation method may be applied. In this method, a polymer is prepared by adding water to at least one hydrolyzable silane compound alone or in admixture with an organic solvent, stirring the mixture, thereby contacting the hydrolyzable silane compound with water to perform hydrolytic reaction, reacting silanol groups resulting from hydrolysis with each other or with another hydrolyzable group to form a siloxane bond (—Si—O—Si—), thereby achieving polycondensation. After polymerization, the reaction mixture is neutralized. Finally, the organic solvent is distilled off, yielding a siloxane resin in solid form. Unlike solvent-insoluble gel, this solid resin can be dissolved in an organic solvent again. The method for the preparation of a siloxane resin to be used as component (3) is more advantageous when hydrolysis is performed under strongly acidic conditions, typically at pH 2 or below. Under such strongly acidic conditions, silanol groups contributing to polycondensation reaction are unstable as compared under weakly acidic conditions, allowing reactions to take place rapidly in sequence to form a higher molecular weight compound.

An appropriate amount of water used in hydrolysis may be determined depending on the type of hydrolyzable group on a silane used as the reactant. When the reactant is an alkoxysilane, water is preferably less than 1.5 moles, more preferably 0.6 to 1.0 mole per mole of hydrolyzable group $OR^3$. If the amount of water for hydrolysis is at least 1.5 moles during polycondensation reaction under strongly acidic conditions, then rapid condensation takes place in a three-dimensional manner, undesirably leading to gelation. When the reactant is a chlorosilane, the amount of water for hydrolysis is not particularly limited. For hydrolysis, an organic solvent may be used, preferably a nonpolar solvent which is less miscible with water. For example, hydrocarbon solvents such as toluene, xylene and hexane are advantageously used. If an organic solvent is extremely immiscible with water, hydrolysis reaction may be retarded. In such a case, a polar solvent such as alcohols may be used along with the organic solvent. The hydrolyzable silane compound used as the reactant may be the same as the compound of formula (1) or a corresponding chlorosilane. Suitable silane compounds include vinyltrichlorosilane, vinyltrimethoxysilane, vinyltriethoxysilane, vinylmethyldichlorosilane, vinylmethyldimethoxysilane, vinylmethyldiethoxysilane, tetrachlorosilane, tetramethoxysilane, tetraethoxysilane, methyltrichlorosilane, methyltrimethoxysilane, methyldimethoxysilane, methyltriethoxysilane, methyltriisopropoxysilane, propyltrichlorosilane, propyltrimethoxysilane, propyltriethoxysilane, hexyltrichlorosilane, hexyltrimethoxysilane, phenyltrichlorosilane, phenyltrimethoxysilane, and diphenyldimethoxysilane. Inter alia, methyltrimethoxysilane, dimethyldimethoxysilane, methyltriethoxysilane, dimethyldiethoxysilane, and phenyltrimethoxysilane are preferred.

An appropriate amount of component (3) used is 3 to 100 parts, more preferably 3 to 80 parts by weight per 100 parts by weight of components (A), (B) and (2) combined. Less than 3 pbw of component (3) may fail to exert the crack-preventing effect whereas more than 100 pbw of component (3) may lead to a hard topcoat film having an extremely low hardness and wear resistance.

When the siloxane resin as component (3) is compounded, an organic solvent solution of the siloxane resin may be previously prepared and mixed with the other components. This order is preferable because heat is sometimes necessary when the siloxane resin is dissolved in a solvent. Preferred examples of the organic solvent used herein include, but are not limited to, ethanol, isopropanol, isobutanol, propylene glycol monoalkyl ethers, and diacetone alcohol.

Component (4)

Component (4) is a cure catalyst for promoting condensation reaction of condensable groups such as silanol and alkoxy groups. Any of cure catalysts used in prior art well-known hard topcoat compositions may be used. Exemplary of the cure catalyst are sodium propionate, sodium acetate, sodium formate, trimethylbenzylammonium hydroxide, tetramethylammonium hydroxide, tetrabutylammonium hydroxide, tris(acetylacetonato)aluminum, and aluminum diisopropoxy(ethylacetoacetate).

An amount of component (4) used is not particularly limited insofar as the amount is effective for curing of components (1) to (3). Preferably, component (4) is used in an amount of 0.0001 to 30%, more preferably 0.001 to 10% by weight based on the solids of components (1) to (3). Less than 0.0001 wt % of component (4) may provide insufficient cure and hence, a low hardness whereas more than 30 wt % of component (4) may result in a coating which is prone to crack and has low water resistance.

Component (5)

The coating composition for forming the second layer may further comprise (5) a hydrolytic condensate or reaction product as an optional component. It is the reaction product of a titanium tetraalkoxide with a β-diketone and/or a hydrolytic condensate (or reaction product) of a mixture of a titanium tetraalkoxide and a β-diketone. It is the reaction product obtained by reacting a titanium compound with a β-diketone of the general formula: $R^{31}COCH_2COR^{32}$ wherein $R^{31}$ and $R^{32}$ are each independently $C_1$-$C_6$ alkyl, in a solvent and further effecting hydrolytic condensation reaction.

Examples of the titanium alkoxide include tetra-i-propoxytitanium, tetra-n-butoxytitanium, tetrakis(2-ethylhexyloxy)titanium, and tetrastearyloxytitanium. An oligomer of such a titanium alkoxide is also acceptable.

In the formula representing β-diketone, $R^{31}$ and $R^{32}$ may be selected from methyl, ethyl, n-propyl, i-propyl, n-butyl, sec-butyl, t-butyl, and hexyl. Examples of the β-diketone include acetylacetone, 2,4-hexanedione, 2,4-heptanedione, 3,5-heptanedione, 2,4-octanedione, 2,4-nonanedione, 5-methylhexanedione, and 2,2,6,6-tetramethyl-3,5-heptanedione. Inter alia, acetylacetone is most preferred. The β-diketones may be used alone or in admixture of two or more.

Component (5) may be obtained by reacting a titanium compound with a β-diketone in a solvent and further effecting hydrolytic condensation reaction. The titanium compound and the β-diketone are preferably combined in such amounts that 0.5 to 2 moles, more preferably 0.7 to 1.0 mole of the β-diketone may be present per mole of the titanium compound. If less than 0.5 mole of the β-diketone is present, gelation or instability may occur during the subsequent hydrolytic condensation. If more than 2 moles of the β-diketone is present, the subsequent hydrolytic condensation may not take place smoothly, resulting in an inadequate coating composition and an economic disadvantage.

The solvent used for the reaction is preferably selected from alcohols and low-boiling organic solvents having a boiling point of up to 120° C. Suitable alcohols include monohydric and dihydric alcohols. The preferred monohydric alcohols are saturated aliphatic alcohols of 1 to 8 carbon atoms. Examples of the alcohol include methanol, ethanol, n-propyl alcohol, isopropyl alcohol, n-butyl alcohol, sec-butyl alcohol, t-butyl alcohol, ethylene glycol, diethylene glycol, triethylene glycol, ethylene glycol monobutyl ether, and ethylene glycol monoethyl ether acetate. Examples of the low-boiling organic solvents having a boiling point of up to 120° C. include acetone, methyl ethyl ketone, and tetrahydrofuran.

In the first step of the above-mentioned method, a titanium compound is reacted with a β-diketone. The reaction may preferably be carried out at a temperature of 20 to 120° C. for 1 to 10 hours.

In the second step, hydrolytic condensation is carried out. Preferably water is added in an amount of 3.1 to 15 times, more preferably 3.4 to 8.0 times in molar equivalent the amount of the titanium compound whereupon hydrolytic condensation takes place. If the amount of water is less than 3.1 times molar equivalent, the reaction product may not take the form of fine particles, leading to a weak UV absorbing ability. If the amount of water is more than 15 times molar equivalent, gelation may occur.

Preferably hydrolytic condensation is carried out at a temperature of 20 to 120° C. for 1 to 30 hours. More preferably reaction is carried out at an elevated temperature of 60 to 90° C. for 5 to 20 hours. During the hydrolytic condensation, the reaction system may be under acidic or alkaline conditions. To this end, any of well-known acidic and basic catalysts may be used. Suitable acidic catalysts include acidic hydrogen halides, carboxylic acids and sulfonic acids, for example, hydrochloric acid, nitric acid, sulfuric acid, acetic acid and maleic acid. Suitable basic catalysts include amines, for example, ammonia, dimethylamine and diethylamine.

In this way, component (5) may be obtained in the form of metal oxide fine particles containing a β-keto ester group (β-diketone group) and having an average particle size of up to 100 nm, that absorb UV radiation of 350 nm or shorter.

In the coating composition, the hydrolytic condensate as component (5) is preferably added in an amount of 0.01 to 10 parts by weight per 100 parts by weight as the solids of components (1) to (4). On the same basis, the amount of the hydrolytic condensate added is more preferably at least 0.1 pbw, even more preferably at least 0.2 pbw, and more preferably up to 5 pbw, even more preferably up to 3 pbw. More than 10 pbw of the hydrolytic condensate is uneconomical whereas less than 0.01 pbw of the hydrolytic condensate may fail to achieve the desired weather resistance and wear resistance.

Resin Layer

The cured coating system formed on a plastic substrate exerts long-term durability by the mechanism that the UV absorber in the primer layer comprising components (a), (b) and (c) is effective for preventing the substrate from yellowing and surface degradation, and the silane compound as component (B) in the hard top layer exerts a UV absorbing effect for preventing degradation at the interface between the hard top layer and the primer layer.

The coating composition(s) may be applied to at least one surface of a substrate directly or via at least one layer of different composition and cured to form a cured film, obtaining a coated article.

More particularly, each layer, that is, each of the hard top composition and the primer composition may be applied to the substrate by standard coating techniques. A choice may be made among various coating techniques, for example, brush coating, spraying, dipping, flow coating, roll coating, curtain coating, spin coating, and knife coating.

The film forming process preferably involves the successive steps of coating the primer composition onto the substrate, air drying or heating the coating for curing into a first layer or primer layer, coating the hard top composition onto the primer layer, drying at room temperature or heating the coating for curing to form a second layer or hard top layer.

Curing of the composition after coating may be achieved by air drying (i.e., holding in air) and/or heating. The curing temperature and time are not particularly limited. The preferred cure step includes heating at a temperature below the heat resistance limit of the substrate for 10 minutes to 2 hours, more preferably at 80 to 145° C. for 30 minutes to 2 hours.

The thickness of each coating (or layer) is not particularly limited although it is often 0.01 to 100 μm, typically 0.5 to 60 μm. A thickness of 1 to 30 μm is especially preferred for the hardness, mar resistance, long-term stable adhesion and crack resistance of the coating. Each composition may be applied as multiple stacked coats by repeating the above-mentioned procedure. In particular, the thickness of the primer layer is preferably in a range of 0.5 to 20 μm for protecting the plastic substrate from UV. If the primer layer is too thin, it may provide insufficient adhesion to the hard top layer. If the primer layer is too thick, it is likely to contain bubbles or voids, losing hardness. On the other hand, if the hard top layer is too thin, its hardness may be insufficient. If the hard top layer is too thick, it may be prone to crack.

EXAMPLE

Synthesis Examples, Examples and Comparative Examples are given below by way of illustration and not by way of limitation. Unless otherwise stated, all parts and percents are by weight. Mw denotes a weight average molecular weight as determined by GPC using polystyrene standards.

Synthesis Example

Synthesis Examples of reactive UV absorber are given below, and Preparation Examples of hard top composition and primer composition are presented.

1) Synthesis of Reactive UV Absorber

Synthesis Example 1

Synthesis of Silylated UV Absorber (UVE-Silane)

A flask equipped with a thermometer, heater and reflux condenser was charged with 100 g (0.406 mol) of 2,2',4,4'-tetrahydroxybenzophenone and 500 g of methyl isobutyl ketone (MIBK), which were stirred for dissolution. To the solution were added 100 g (0.82 mol) of allyl bromide and 138 g (1 mol) of anhydrous potassium carbonate. With vigorous stirring, the solution was heated in an oil bath at 110° C. for 5 hours.

From the reaction solution, the salt formed, potassium bromide was removed by filtration, and the solvent MIBK was removed by vacuum stripping. In this way, about 100 g of 2,2'-dihydroxy-4,4'-diallyloxybenzophenone was obtained in red viscous oil form. The product was crystallized from methanol and then filtered, obtaining 88.6 g (0.272 mol) of 2,2'-dihydroxy-4,4'-diallyloxybenzophenone in yellow solid form. Yield 67%, m.p. 95° C.

In 70 ml of toluene was suspended 32.6 g (0.1 mol) of 2,2'-dihydroxy-4,4'-diallyloxybenzophenone. Two droplets of platinum catalyst PL50-T (Shin-Etsu Chemical Co., Ltd.) were added to the suspension. The temperature was raised to 65° C., whereupon 29.3 g (0.24 mol) of trimethoxysilane was added to the suspension.

The reaction mixture was maintained at a temperature of about 65 to 85° C. for about 1 to 2 hours. The reaction mixture was cooled, whereupon 5 g of Wakogel C-100 was added thereto whereby the platinum catalyst was adsorbed. This was followed by filtration and vacuum stripping of the solvent, yielding 51.9 g (0.091 mol) of a red oily matter. A NMR spectrum of the main ingredient corresponded to the structure of 2,2'-dihydroxy-4,4'-bis(trimethoxysilylpropoxy) benzophenone. Yield 91%. This silane is designated UVE-silane.

Synthesis Example 2

Synthesis of Silylated UV Absorber (UVA-Silane)

An allylated UV absorber, 4-allyloxy-2-hydroxy-benzophenone was purchased from Aldrich. In 70 ml of toluene was suspended 25.4 g (0.1 mol) of 4-allyloxy-2-hydroxy-benzophenone. Two droplets of platinum catalyst PL50-T (Shin-Etsu Chemical Co., Ltd.) were added to the suspension. The temperature was raised to 65° C., whereupon 29.3 g (0.24 mol) of trimethoxysilane was added to the suspension.

The reaction mixture was maintained at a temperature of about 65 to 85° C. for about 1 to 2 hours. The reaction mixture was cooled, whereupon 5 g of Wakogel C-100 was added thereto whereby the platinum catalyst was adsorbed. This was followed by filtration and vacuum stripping of the solvent, yielding 34.8 g (0.092 mol) of a red oily matter. A NMR spectrum of the main ingredient corresponded to the structure of 2-hydroxy-4-trimethoxysilylpropoxybenzophenone. Yield 92%. This silane is designated UVA-silane.

A comparative UV absorber is commercially available 2,4-dihydroxybenzophenone, designated Benzophenone A.

2) Preparation of Hard Top Composition

Preparation of Polysiloxane (D) as Component (3) in Hard Top Composition

Synthesis Example of Component (3)

A 2-L three-necked flask equipped with a thermometer, stirrer and condenser was charged with 408 parts of methyltrimethoxysilane and 400 parts of toluene, and further with 11 parts of 98% methanesulfonic acid as a catalyst. While the internal temperature was kept below 30° C., 146 parts of water was added dropwise to effect hydrolysis of methyltrimethoxysilane. At the end of dropwise addition, the reaction mixture was stirred at room temperature for a further 2 hours until the reaction was completed.

Thereafter, the acidic component was neutralized and the methanol formed was distilled off in vacuum. The salt of neutralization was completely removed by twice water washing. The solvent component including toluene was removed by vacuum distillation again until a weight loss of 1.1 wt % upon 105° C./3 hour drying was reached. There was obtained 210 parts of a siloxane resin in colorless transparent solid form.

The resin had a Mw of $7.5 \times 10^3$ as measured by GPC. On analysis of the resin by $^{29}$Si-NMR and IR spectroscopy, the siloxane resin has the average compositional formula (D):

$$\text{MeSi(OMe)}_{0.06}(\text{OH})_{0.12}(\text{O})_{1.41} \quad (D)$$

wherein Me is methyl.

The transparent solid resin had a softening point of 73° C. as measured by an automatic softening point tester of the ring-and-ball method according to JIS K-2207. A siloxane resin solution D having a solid concentration of 28 wt % was prepared in advance by adding 283 parts of the siloxane resin to 717 parts of isopropanol and dissolving therein.

Preparation of Component (4) in Hard Top Composition

Synthesis Example of Solution F

A 0.5-L flask equipped with a stirrer, condenser and thermometer was charged with 170.6 g (0.6 mol) of titanium tetraisopropoxide. With stirring under ice cooling, 140 g (1.4 mol) of acetylacetone was added dropwise from a dropping funnel while the internal temperature rose to 25° C. The solution was stirred at room temperature for 2 hours for maturing, whereupon a hydrolyzable metal compound was obtained in yellow clear solution form.

Thereafter, 46.0 g of 6.9% aqueous ammonia (2.38 mol of water) was added dropwise at room temperature over 20 minutes. The temperature rose to 35° C. due to exothermic reaction, and then resumed room temperature. Reaction was continued at room temperature for 20 hours, yielding a yellowish white precipitate. This was filtered, washed with acetone, and vacuum dried at 60° C. for 3 hours, obtaining 121 g of a yellowish white powder material.

The material was diluted with ethanol to a solid concentration of 0.05 g/L. The solution was analyzed for absorbance by spectroscopy, finding absorption at a wavelength of 350 nm or shorter. On additional elemental analysis, the material was found to contain an acetylacetonato group in substantial conformity with the theory.

Finally, the material was diluted with methanol to form a solution having a solid concentration of 20%, designated solution F.

Preparation Example of Topcoat Solution 1

A 2-L flask equipped with a stirrer, condenser and thermometer was charged with 371 g of methyltrimethoxysilane and 8.6 g of UVE-silane. While the contents were stirred and kept at 20° C., a mixture of 108 g of water-dispersed colloidal silica (Snowtex O, average particle size 15-20 nm, $SiO_2$ content 20%, Nissan Chemical Industries, Ltd.) and 252 g of 0.25N acetic acid aqueous solution was added thereto and stirred at a high speed. Stirring was continued at 60° C. for a further 3 hours, and 330 g of cyclohexanone was added. Thereafter, methanol by-product and part of water in a total amount of 335 g were distilled off under atmospheric pressure.

Thereafter, 205 g of isopropanol, 400 g of solution D (siloxane resin solution D), 4 g of solution F (20% methanol solution F), and 0.6 g of polyether-modified silicone KP-341 (Shin-Etsu Chemical Co., Ltd.) as a leveling agent were added, and 3.7 g of a 10% tetrabutylammonium hydroxide aqueous solution as a cure catalyst added.

The organopolysiloxane solution thus obtained had a viscosity of 6.98 mm$^2$/s and a Mw of 2,500 as measured by GPC. This is designated Topcoat Solution 1.

Preparation Example of Topcoat Solution 2

The procedure of Topcoat Solution 1 was repeated aside from using 368 g of methyltrimethoxysilane and 13 g of UVA-silane instead of 371 g of methyltrimethoxysilane and 8.6 g of UVE-silane. This is designated Topcoat Solution 2.

Preparation Example of Comparative Topcoat Solution 1

The procedure of Topcoat Solution 1 was repeated aside from using 373 g of methyltrimethoxysilane instead of 371 g of methyltrimethoxysilane and 8.6 g of UVE-silane. This is designated Comparative Topcoat Solution 1.

Preparation Example of Comparative Topcoat Solution 2

The procedure of Topcoat Solution 1 was repeated aside from using 13 g of Benzophenone A (2,4-dihydroxybenzophenone) instead of UVE-silane. This is designated Comparative Topcoat Solution 2.

Preparation Example of Comparative Topcoat Solution 3

A 2-L flask equipped with a stirrer, condenser and thermometer was charged with 368 g of methyltrimethoxysilane and 13 g of UVA-silane. While the contents were stirred and kept at 20° C., 252 g of 0.25N acetic acid aqueous solution was added thereto and stirred at a high speed. Stirring was continued at 60° C. for a further 3 hours, and 330 g of cyclohexanone was added. Thereafter, methanol by-product and part of water in a total amount of 335 g were distilled off under atmospheric pressure.

Thereafter, 108 g of water-dispersed colloidal silica (Snowtex O, average particle size 15-20 nm, $SiO_2$ content 20%, Nissan Chemical Industries, Ltd.), 205 g of isopropanol, 400 g of solution D (siloxane resin solution D), 4 g of solution F (20% methanol solution F), and 0.6 g of polyether-modified silicone KP-341 (Shin-Etsu Chemical Co., Ltd.) as a leveling agent were added, and 3.7 g of a 10% tetrabutylammonium hydroxide aqueous solution as a cure catalyst added.

The organopolysiloxane solution thus obtained had a viscosity of 6.81 $mm^2/s$ and a Mw of 2,500 as measured by GPC. This is designated Comparative Topcoat Solution 3.

Physical properties of the UV absorbers are summarized in Table 1. Physical properties of the hard topcoat compositions are summarized in Table 2.

TABLE 1

|  |  | Synthesis Example | | Comparative Example | |
|---|---|---|---|---|---|
|  |  | 1 | 2 | 1 | 2 |
| UV absorber |  | UVE-silane | UVA-silane | nil | Benzophenone A* |
| Physical properties | Appearance | red liquid | yellow liquid | — | yellowish white solid |
|  | Si-bonded alkoxy group (mmol/g) | 10.52 | 7.97 | 0 | 0 |
|  | Phenolic hydroxy group (mmol/g) | 3.51 | 2.66 | 0 | 16.2 |
| Appearance |  | high viscosity oil | high viscosity oil | — | Solid, m.p. 69° C. |
| UV absorbing ability |  | ◎ | ◎ | X | ◎ |

*2,4-dihydroxybenzophenone

TABLE 2

Preparation of Topcoat Solution and Comparative Topcoat Solution

|  |  | Topcoat Solution | | Comparative Topcoat Solution | | |
|---|---|---|---|---|---|---|
|  |  | 1 | 2 | 1 | 2 | 3 |
| Appearance |  | faintly red, clear | faintly yellow, clear | colorless, clear | faintly yellow, clear | faintly yellow, clear |
| Silica incorporation mode |  | reaction | reaction | reaction | reaction | simple mixing |
| UV absorber |  | UVE-silane | UVA-silane | nil | Benzophenone A* | UVA-silane |
| UV absorptive group content | % | 1 | 2 | 0 | 4 | 2 |
| Viscosity** | $mm^2/s$ | 6.98 | 7.47 | 5.9 | 6.5 | 6.81 |
| Nonvolatile @150° C./0.5 hr | % | 25.5 | 25 | 24.7 | 25.2 | 25.3 |

*2,4-dihydroxybenzophenone
**viscosity at 25° C. by Ostwald viscometer

3) Synthesis of Polymer in Primer Composition

Synthesis Example of Polymer 1

A 2-L flask equipped with a stirrer, condenser and thermometer was charged with 248 g of diacetone alcohol as solvent, which was heated at 80° C. under a nitrogen stream. A mixed monomer solution was previously prepared by dissolving 72 g of 2-[2'-hydroxy-5'-(2-methacryloxyethyl)-phenyl]-2H-benzotriazole (RUVA-93, Otsuka Chemical Co., Ltd.), 80 g of γ-methacryloxypropyltrimethoxysilane (KBM-503, Shin-Etsu Chemical Co., Ltd.), and 270 g of methyl methacrylate (MMA) in 600 g of diacetone alcohol (DAA). An initiator solution was previously prepared by dissolving 3 g of 2,2'-azobis(2-methylbutyronitrile) (V-59, Wako Pure Chemical Industries, Ltd.) in 200 g of diacetone alcohol. A portion (400 g) of the mixed monomer solution and a portion (150 g) of the initiator solution were successively poured into the flask.

The flask was held at 80° C. for 30 minutes for reaction to run, after which the remainder of the mixed monomer solution and the remainder of the initiator solution were simultaneously added dropwise over 1.5 hours at 80 to 90° C. The reaction mixture was stirred at 80 to 90° C. for a further 5 hours.

The resulting solution of a UV-absorbing vinyl copolymer having an alkoxysilyl group had a viscosity of 5,370 mPa·s at 25° C. as measured by a rotational viscometer. The copolymer had a UV absorptive unit content of 18% and an alkoxysilyl content of 20%. The copolymer had a Mw of 27,600 as measured by GPC versus polystyrene standards. This UV-absorbing vinyl copolymer having an alkoxysilyl group (in solution form) is designated Polymer 1.

Synthesis Example of Comparative Polymer 1

The procedure of Polymer 1 was repeated aside from using glycidyl methacrylate (GMA) instead of KBM-503. The vinyl copolymer is designated Comparative Polymer 1.

Preparation Examples of Primer Solutions 1, 2 and Comparative Primer Solutions 1, 2

A primer solution was prepared by adding diacetone alcohol (DAA), di(propylene glycol)monomethyl ether (MFDG), propylene glycol monomethyl ether acetate (PG-MAC), and ethyl acetate (EA) as solvent, a silica sol solution dispersed in organic solvent (colloidal silica dispersed in propylene glycol monomethyl ether acetate, solid concentration 30%, primary particle size 10-15 nm, available as PMA-ST from Nissan Chemical Industries, Ltd.), and optionally a dehydrating agent (triethyl orthoformate) to the polymer solution of Polymer 1 or Comparative Polymer 1.

The formulation and physical properties of the primer polymer are shown in Tables 3 and 4. The formulation and physical properties of the primer solution are summarized in Tables 5 and 6.

TABLE 3

Formulation (wt %) of primer polymer

| Formulation | Ingredients | Polymer 1 | Comparative Polymer 1 |
|---|---|---|---|
| Monomers | KBM-503 | 20 | 0 |
|  | UVA monomer | 18 | 18 |
|  | GMA | 0 | 20 |
|  | MMA | 62 | 62 |
| Solvent | DAA | 60 | 60 |
| Catalyst | V-59 | 0.3 | 0.3 |

TABLE 4

Physical properties of primer polymer solution

| Solution physical properties | Polymer 1 | Comparative Polymer 1 |
|---|---|---|
| Appearance | faintly yellow, clear | faintly yellow, clear |
| Mw in 1% THF by GPC | 27,600 | 78,300 |
| Kinematic viscosity***, mPa-s | 5,370 | 10,020 |
| Refractive index @25° C. | 1.4551 | 1.4555 |
| Nonvolatile @150° C./0.5 hr, % | 41.2 | 39.9 |

***viscosity at 25° C. by rotational viscometer

TABLE 5

Formulation (wt %) of primer solution

|  |  | Primer Solution | | Comparative Primer Solution | |
|---|---|---|---|---|---|
| Formulation | Ingredients | 1 | 2 | 1 | 2 |
| Polymer | Type | Polymer 1 | Polymer 1 | Comparative Polymer 1 | Polymer 1 |
|  | Solution amount | 30 | 30 | 30 | 35 |
|  | Polymer amount | 12 | 12 | 12 | 14 |
| Diluent | DAA | 50 | 43 | 50 | 52 |
|  | MFDG | 5 | 5 | 5 | 5 |
|  | PGMAC | 3 | 3 | 3 | 3 |
|  | EA | 5 | 5 | 5 | 5 |
| Silica sol | PMA-ST | 7 | 7 | 7 | 0 |
|  | Silicon dioxide amount | 2 | 2 | 2 | 0 |
| Additive | Dehydrating agent | 0 | 7 | 0 | 0 |
| Total solution amount | wt % | 100 | 100 | 100 | 100 |
| Polymer/silica | wt % | 85/15 | 85/15 | 85/15 | 100/0 |

TABLE 6

Physical properties of primer solution

|  | Primer solution | | Comparative primer solution | |
|---|---|---|---|---|
|  | 1 | 2 | 1 | 2 |
| Appearance | Faintly yellow, clear | Faintly yellow, clear | Faintly yellow, clear | Faintly yellow, clear |
| Methanol removal, % | 9 | 0 | 0 | 0 |

TABLE 6-continued

Physical properties of primer solution

|  | Primer solution | | Comparative primer solution | |
|---|---|---|---|---|
|  | 1 | 2 | 1 | 2 |
| Viscosity, mm$^2$/s | 17.3 | 16.6 | 31.8 | 15.9 |
| Nonvolatile @150° C./0.5 hr, % | 14.4 | 14.1 | 10.1 | 14 |

Examples 1 to 3 and Comparative Examples 1 to 5

The primer composition was flow coated onto a cleaned surface of a polycarbonate resin sheet of 0.5 mm thick (Iupilon sheet by Mitsubishi Engineering Plastics Corp.), air dried at room temperature for 45 minutes, and heat cured at 135° C. for 45 minutes to form a cured film of 10 μm thick. This coating procedure was repeated twice. The hard topcoat composition was flow coated onto the primer layer, air dried at room temperature for 45 minutes, and heat cured at 135° C. for 60 minutes to form a cured film of 5 μm thick. The multilayer coating thus obtained was evaluated by the following tests. The results of the tests are summarized in Tables 7 and 8.

Tests

Various physical properties were measured and evaluated as follows.

1) Test Method

The coating on polycarbonate resin was examined for optical properties, film properties, and durability. The storage stability of the primer solution was examined by analyzing the solution by $^{13}$C-NMR spectroscopy to determine a proportion of methanol removed from the polymer.

(1) Optical Properties

Optical properties were measured in order to evaluate the transparency and UV screening ability of a coating.

(1.1) Initial Coating Appearance

After a primer layer and a hard topcoat layer were successively cured and stacked on a PC sheet to form a laminate sample, the appearance of the coating of the sample was visually observed.

(1.2) Measurement of UV-Vis Transmission Spectrum

A hard topcoat layer and a multilayer coating of primer layer/hard topcoat layer, both formed on quartz glass of 1 mm thick, were analyzed for UV-Vis transmission spectrum over a wavelength range of 200 to 500 nm by a spectrophotometer U-3310 (Hitachi, Ltd.). Transparency was evaluated in terms of a transmittance at 450 nm of the multilayer coating of primer layer/hard top layer. UV screening ability was evaluated in terms of a transmittance at 350 nm of the hard top layer and the multilayer coating of primer layer/hard top layer.

(2) Film Properties

Film properties were measured in order to evaluate the adhesion and mar resistance of a coating.

(2.1) Initial Adhesion

Adhesion was analyzed by a cross-hatch adhesion test according to JIS K-5400, specifically by scribing the coating with a razor along 6 longitudinal and 6 transverse lines at a spacing of 2 mm to define 25 square sections, tightly attaching adhesive tape (Cellotape) thereto, rapidly pulling back the adhesive tape at an angle of 90°, and counting the number. (X) of sections kept unpeeled. The result was reported as X/25.

(2.2) Water Resistance and Water-Proof Adhesion

A sample was immersed in boiling water for 2 hours. Thereafter, its appearance was visually observed and the adhesion test was carried out as above.

(2.3) Mar Resistance

A Taber abrasion test according to ASTM D1044 was carried out by using a Taber abrasion tester equipped with CS-10F wheels, rotating under a load of 500 g over 500 revolutions, and measuring a haze (H). Mar resistance was evaluated in terms of $\Delta H$ which is the haze after the test minus the haze before the test.

Acceptable (○): $\Delta H \leq 6.0$
Mediocre (Δ): $6.1 < \Delta H < 10.0$
Unacceptable (x): $\Delta H \geq 10.0$ (3) Durability (3.1) Weathering Test A weathering test was carried out by Eyesuper UV tester (Iwasaki Electric Co., Ltd.) which was operated so as to repeat a weathering cycle consisting of three L, R and D modes, a duration of one cycle being 12 hours.

L mode (light irradiation mode), 4 hours
black panel temperature 63° C.
humidity 70% RH
illuminance 90 mW/cm$^2$
R mode (dewing mode), 4 hours
black panel temperature 70° C.
humidity 90% RH
D mode (quiescent mode), 4 hours
uncontrolled holding
black panel temperature 30° C.
humidity≥95% RH
raining 15 sec/hour Separation of Coating after Weathering Test The coating after the weathering test was evaluated according to the following criterion. The result is the number of cycles repeated until the overall separation occurred.

Acceptable (○): intact
Mediocre (Δ): partial separation between primer layer and substrate
Unacceptable (x): overall separation between primer layer and substrate

TABLE 7

| | Compositional | Reference Examples | | | Comparative Examples | | | | |
|---|---|---|---|---|---|---|---|---|---|
| Coating | features | 1 | 2 | Example | 1 | 2 | 3 | 4 | 5 |
| Hard top layer | Topcoat solution | Topcoat solution 1 | Topcoat solution 2 | Topcoat solution 2 | Comp. topcoat solution 1 | Comp. topcoat solution 2 | Comp. topcoat solution 3 | Topcoat solution 2 | Topcoat solution 2 |
| | UV absorber | UVE-silane | UVA-silane | UVA-silane | nil | Benzophenone A | UVA-silane | UVA-silane | UVA-silane |
| | Silica incorporation mode | reaction | reaction | reaction | reaction | reaction | simple mixing | reaction | reaction |
| Primer layer | Primer | Primer solution 1 | Primer solution 1 | Primer solution 2 | Primer solution 1 | Primer solution 1 | Primer solution 1 | Comp. primer solution 1 | Comp. primer solution 2 |
| | Alkoxy group | present | present | present | present | present | present | absent | present |
| | Dehydrating agent | nil | nil | added | nil | nil | nil | nil | nil |
| | Silica | added | added | added | added | added | added | added | nil |
| | Stability | ○ | ○ | ◎ | ○ | ○ | ○ | ○ | ○ |

TABLE 8

| | | Reference Examples | | Ex- | Comparative Examples | | | | |
|---|---|---|---|---|---|---|---|---|---|
| | | 1 | 2 | ample | 1 | 2 | 3 | 4 | 5 |
| Film thickness | Hard topcoat layer (μm) | 5 | 5 | 5 | 5 | 5 | 5 | 5 | 5 |
| | Primer layer (μm) | 10 | 10 | 10 | 10 | 10 | 10 | 10 | 10 |

TABLE 8-continued

| | | Reference Examples | | Example | Comparative Examples | | | | |
|---|---|---|---|---|---|---|---|---|---|
| | | 1 | 2 | | 1 | 2 | 3 | 4 | 5 |
| Optical properties | 450-nm transparency (%) | 100 | 100 | 100 | 100 | 60 | 65 | 100 | 100 |
| | 350-nm UV screen (%) | 100 | 100 | 100 | 100 | 100 | 100 | 100 | 100 |
| | UV screen of topcoat layer alone (%) | 100 | 100 | 100 | 0 | 100 | 100 | 100 | 100 |
| Film properties | Initial adhesion | 25/25 | 25/25 | 25/25 | 25/25 | 25/25 | 25/25 | 25/25 | 25/25 |
| | Boiling adhesion | 25/25 | 25/25 | 25/25 | 25/25 | 25/25 | 25/25 | 18/25 | 23/25 |
| | ΔH | 6 | 6 | 6 | 6 | 10 | 16 | 6 | 6 |
| Durability | durable adhesion until separation | <100cy | <100cy | <100cy | 80cy | 70cy | 60cy | 20cy | 50cy |
| Evaluation | Optical properties | ○ | ○ | ○ | ○ | X | X | ○ | ○ |
| | Film properties | ○ | ○ | ○ | ○ | Δ | X | X | X |
| | Durability | ○ | ○ | ○ | X | X | X | X | X |
| | Overall evaluation | ○ | ○ | ⊚ | X | X | X | X | X |

It is demonstrated that plastic substrates, specifically polycarbonate resin substrates, covered with a multilayer coating of primer layer and hard topcoat layer display high transparency, mar resistance, and weather resistance.

Japanese Patent Application No. 2010-198654 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An automotive glazing, comprising a substrate and at least two resin layers on a surface of the substrate, wherein said at least two resin layers include a first or primer layer disposed adjacent the substrate surface and a second or hard top layer disposed on the first layer, the first layer comprises a cured resin layer comprising a vinyl copolymer having alkoxysilyl and UV-absorptive groups and particulate silicon dioxide, wherein said cured resin layer is a cured product of a coating composition, said coating composition consisting of one or more organic solvents and (i) a vinyl copolymer resin which is a copolymerization product of (a) 1 to 30% by weight of a vinyl monomer containing an organic UV-absorptive group, (b) 1 to 30% by weight of an alkoxysilyl-containing vinyl monomer, and (c) 40 to 98% by weight of another vinyl monomer, and, per 100 parts by weight of said vinyl copolymer resin, (ii) 1 to 50 parts by weight of a dehydrating agent per 100 parts by weight of the vinyl copolymer resin content in the coating composition, and (iii) 1 to 50 parts by weight of particulate silicon dioxide per 100 parts by weight of the vinyl copolymer resin, wherein the organic UV absorptive group in said first layer does not bleed out, and the second layer is a cured resin layer of a UV-absorptive coating composition comprising:

(1) (A) at least one hydrolysable silicon compound having the general formula (1):

$$R^1_a Si(OR^3)_{(4-a)} \quad (1)$$

wherein $R^1$ is a $C_1$-$C_{18}$ organic group, $R^3$ is each independently a $C_1$-$C_6$ organic group, and a is an integer of 0 to 2, or a (partial) hydrolytic condensate thereof, and (B) a reactive UV absorber comprising an alkoxysilyl-containing benzophenone or a (partial) hydrolytic condensate thereof, (2) 5 to 300 parts by weight of particulate silicon dioxide per 100 parts by weight of components (A) and (B) combined, wherein components (1) and (2) are hydrolytic condensation products of components (A) and (B) and component (2) in the presence of an acidic catalyst, (3) 3 to 100 parts by weight of a siloxane resin having the average compositional formula (2) per 100 parts by weight of components (A), (B), and (2) combined:

$$R^2_b Si(OR^3)_c (OH)_d O_{(4-b-c-d)/2} \quad (2)$$

wherein $R^2$ is each independently a $C_1$-$C_{18}$ organic group, $R^3$ is each independently a $C_1$-$C_6$ organic group, b, c, and d are numbers in the range: $0.8 \leq b \leq 1.5$, $0 \leq c \leq 0.3$, $0.001 \leq d \leq 0.5$, and $0.801 \leq b+c+d < 2$, the siloxane resin being solid at or below 40° C. and having a weight average molecular weight of at least 2000, and (4) 0.0001 to 30% by weight of a cure catalyst based on the solids content of components (1), (2), and (3), wherein said dehydrating agent ensures that hydrolyzable silyl groups: remain stable in a solution from which said first or primer layer is formed; form crosslinks with hydrolyzable silyl groups and/or SiOH groups in the vinyl copolymer in the solution from which said first or primer layer is formed; and effectively bond with hydrolyzable silyl groups and/or SiOH groups in the second or hard top layer after coating formation.

2. The automotive glazing of claim 1, wherein component (B) is a reactive UV absorber comprising an alkoxysilyl-containing benzophenone having the general formula (I):

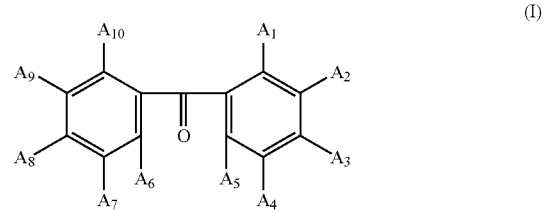

wherein $A_1$ to $A_{10}$ are each independently hydrogen, hydroxyl, $C_1$-$C_5$ alkyl, or a group of the general formula (II):

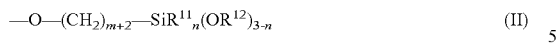 (II)

wherein $R_{11}$ and $R_{12}$ are each independently $C_1$-$C_5$ alkyl, m is an integer of 1 to 5, and n is an integer of 0 to 2, at least one of $A_1$ to $A_{10}$ being a group of formula (II).

3. The automotive glazing of claim 1, wherein the UV-absorptive coating composition further comprises (5) the reaction product of a titanium tetraalkoxide with a β-diketone and/or a hydrolytic condensate of a mixture of a titanium tetraalkoxide and a β-diketone.

4. The automotive glazing of claim 1 wherein the substrate comprises a polycarbonate resin.

5. The automotive glazing of claim 1, wherein said dehydrating agent is selected from the group consisting of orthoformic esters, orthoacetic esters, and carbodiimides.

6. The automotive glazing of claim 5, wherein said dehydrating agent is an orthoformic ester selected from the group consisting of methyl orthoformate, ethyl orthoformate, and propyl orthoformate.

* * * * *